Feb. 14, 1967       R. A. SCHOLTEN       3,304,451
SYNCHRONOUS MOTOR INCLUDING A PERMANENT MAGNET STATOR
Original Filed April 5, 1960                2 Sheets-Sheet 1
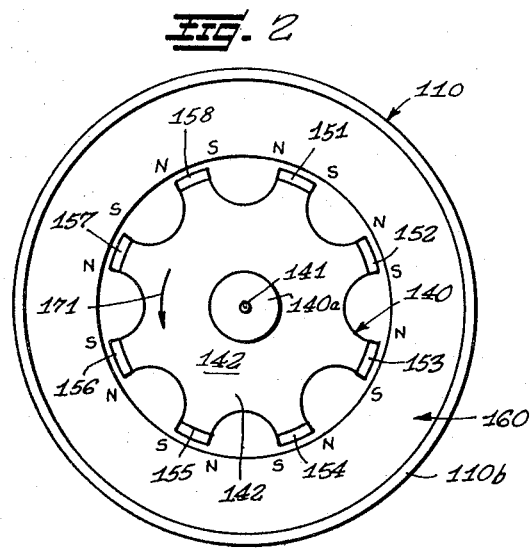
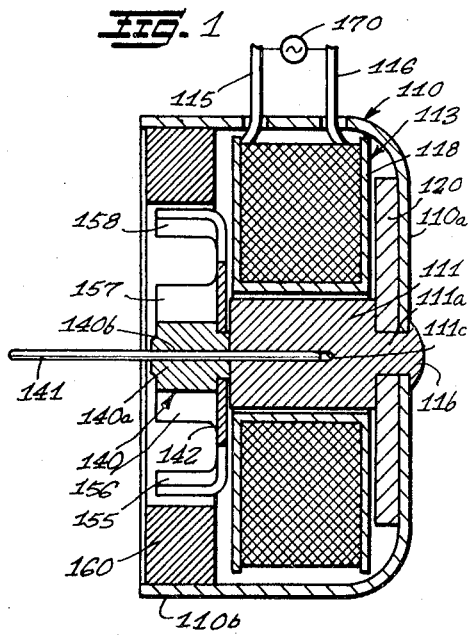
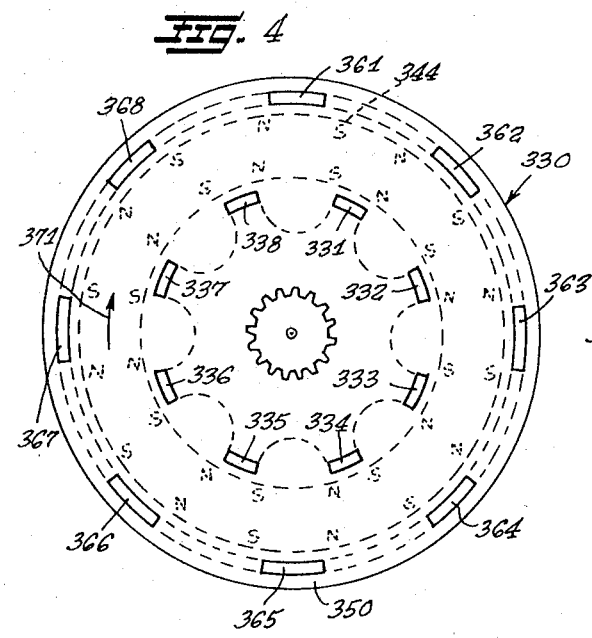
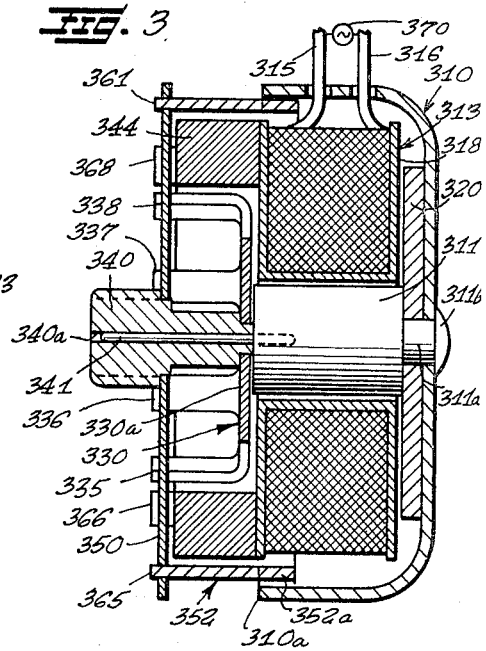
Inventor
Richard A. Scholten
By
Attys Feb. 14, 1967  R. A. SCHOLTEN  3,304,451
SYNCHRONOUS MOTOR INCLUDING A PERMANENT MAGNET STATOR
Original Filed April 5, 1960  2 Sheets-Sheet 2
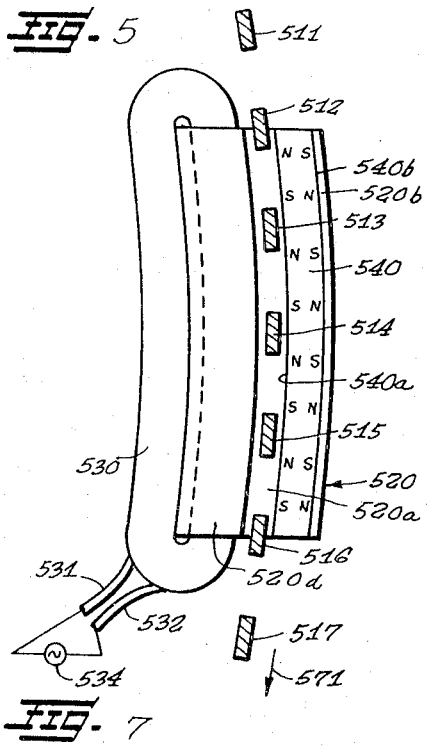
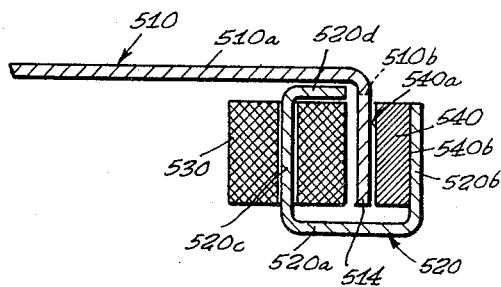
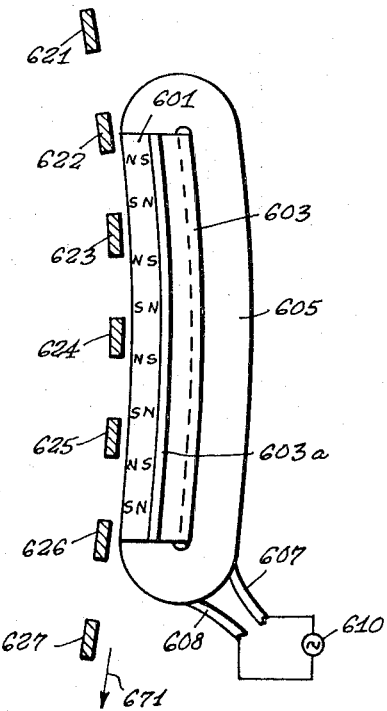
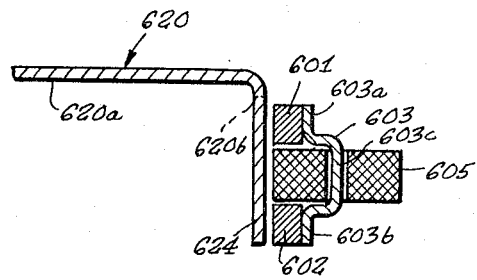
Inventor
Richard A. Scholten
By Hill, Sherman, Meroni, Gross & Simpson
Attys United States Patent Office 3,304,451
Patented Feb. 14, 1967

3,304,451
SYNCHRONOUS MOTOR INCLUDING A
PERMANENT MAGNET STATOR
Richard A. Scholten, Cincinnati, Ohio, assignor to Indiana General Corporation, Valparaiso, Ind., a corporation of Indiana
Original application Apr. 5, 1960, Ser. No. 20,128. Divided and this application May 29, 1963, Ser. No. 284,135
5 Claims. (Cl. 310—154)

The present application is a division of my copending application Serial No. 20,128, filed April 5, 1960, and the disclosure of said copending application is hereby incorporated herein by reference for the purpose of explaining the illustrated embodiments herein in further detail.

This invention relates to electrodynamic machines and particularly to such machines which utilize permanent magnets to provide an operating magnetic field for the machine.

One series of embodiments of the present invention provide more efficient arrangements for synchronous motors such as used in clocks and timing devices. Conventional motors using permanently magnetized rotors have magnets with alternate poles around a given diameter and an electromagnetic field with instantaneous alternate poles on a slightly larger diameter around the permanent magnet rotor. The electromagnetic circuits in such conventional motors have a relatively high leakage flux which detracts from the motor performance. The present invention provides constructions which eliminate the high leakage flux of the conventional permanent magnet motors by using a loop electromagnetic circuit having a gap and having magnetizable material located at the respective ends of the gap and directly adjacent the permanent magnet material of the machine which is disposed in the gap, the permanent magnet material being stationary. In one embodiment, for example, the electromagnetic poles are on different diameters and one or more stationary permanent magnets with alternate poles are located directly between and directly adjacent the electromagnetic poles.

It is, therefore, an important object of the present invention to provide a permanent magnet type electrodynamic machine having greatly reduced leakage flux and correspondingly improved performance characteristics.

It is another object of the present invention to provide a synchronous motor having an output torque which is very substantially increased in comparison with the torque produced by a conventional motor of the same size.

Another object of the invention is to provide a permanent magnet motor construction which has a rotor of relatively low inertia.

A further object of the invention is to provide a synchronous motor of relatively small size and high efficiency and which may take a variety of forms depending on the application desired.

A still further object of the invention is to provide a permanent magnet type electrodynamic machine which is extremely simple and economical to manufacture.

Other objects, features and advantages of the present invention will be apparent from the following detailed description taken in connection with the accompanying drawings, in which:

FIGURE 1 is a vertical sectional view illustrating a first embodiment of the invention which is adapted to provide a rotor of particularly low inertia;

FIGURE 2 is an end elevational view of the embodiment of FIGURE 1;

FIGURE 3 illustrates a second embodiment of the present invention by means of a vertical longitudinal sectional view;

FIGURE 4 shows an end elevational view of the embodiment of FIGURE 3;

FIGURE 5 is a fragmentary horizontal sectional view illustrating a further embodiment of the present invention as applied to a timing motor using a large diameter rotor such as a turntable;

FIGURE 6 is a fragmentary vertical sectional view of the embodiment of FIGURE 5;

FIGURE 7 is a fragmentary horizontal sectional view of another embodiment of a timing motor utilizing a large diameter rotor; and FIGURE 8 is a fragmentary vertical sectional view of the structure of FIGURE 7.

FIGURES 1 and 2 illustrate a first embodiment of the present invention which provides a motor having a rotor of substantially lower inertia than a comparable motor having a rotor of permanent magnet material. In this embodiment, a cup-shaped casing 110 of magnetic material has a cylindrical core 111 of magnetic material staked thereto by means of extension 111a and head portion 111b. A winding assembly 113 is mounted on the core 111 and has leads 115 and 116 connecting therewith. The winding is carried on a spool-type insulating form 118. A plate 120 of magnetic material is interposed between the core 111 and the end 110a of casing 110. A rotor assembly 140 is mounted by means of a shaft 141. The rotor assembly comprises a hub 140a with an axial bore 140b receiving the shaft 141. The hub has secured thereto a spider 142 of magnetic material which is rotatable with the hub 140a and shaft 141 and has a series of low retentivity polar extensions 151–158. The hub portion 140a may be of magnetic material, and receives the shaft 141 in press fit relation, while central bore 111c in core 111 receives shaft 141 in rotatable relation so that output power from the motor may be taken by means of the shaft 141.

The axially extending cylindrical portion 110b of casing 110 has a continuous periphery and has secured to the interior surface thereof a ring permanent magnet 160 which is magnetized as diagrammatically indicated in FIGURE 2. In this embodiment, the magnetization along the inner periphery of the magnet 160 consists of alternate north and south poles uniformly spaced about the inner circumference of the ring, with a north and south pole for each pole of the rotor member 142. In the illustrated embodiment there are eight poles 151–158 on the rotor member 142 and sixteen poles of alternate polarity equally spaced about the inner periphery of the permanent magnet member 160. Each pole about the inner perimeter of the magnet 160 may be produced by placing a pole piece in generally radial alignment with the region to be magnetized and applying a magnetomotive force to the pole pieces in the direction radially into the magnet 160 for the south poles and in the direction radially away from the magnet at the north poles, for example. The portion of the permanent magnet 160 radially outwardly of the inner perimeter may be generally randomly oriented so as to be substantially magnetically neutral.

It will be apparent that if a source 170 of alternating current is connected between the leads 115 and 116 and in its first half cycle causes the poles 151–158 to assume a south magnetic polarity with respect to the rim 110b of the casing 110 the rotor assembly 140 will begin rotation in the direction of the arrow 171 in FIGURE 2. Means may be provided if desired to prevent rotation of the member 142 in the opposite direction. The arrangement of FIGURES 1 and 2 has the advantage of providing a rotor with substantially lower inertia than would be the case if permanent magnet 160 were part of the rotor. Thus the motor of FIGURES 1 and 2 will start more easily than where permanent magnet 160 is part of the rotor. Also, it is an inherent advantage that since permanent magnet 160 is stationary, it need not be rotationally balanced. This leads to very significant economies in the manufacture of the motor.

FIGURES 3 and 4 illustrate a second embodiment of the present invention wherein a casing 310 of magnetic material has a cylindrical core 311 of magnetic material staked thereto by means of an extension 311a and head portion 311b. A winding assembly 313 includes an electric coil having leads 315 and 316 connected with the opposite ends thereof and the coil is mounted on a spool type insulating winding form of non-magnetic material 318. A plate 320 of magnetic material is carried by means of the extension 311a between the winding assembly 313 and the casing 311 and, as in the previous embodiment, serves to increase the cross-section of the magnetic circuit at the side of the core 311 remote from the rotor assembly.

The rotor assembly 330 of the motor comprises a spider member 330a having a series of polar extensions 331–338 integral with the magnetic material of the spider portion 330a. The rotor further includes a hub portion 340 having a central aperture 340a accommodating rotation of the rotor assembly on a bearing pin 341 which is press fitted into a receiving bore of the core 311. The rotor further includes a disk-like plate 350 of non-magnetic material having arcuate apertures receiving the ends of the polar extensions 331–338. The plate 350 carries a cylindrical shell of magnetic material 352 which has a series of polar extensions 361–368 projecting through conforming apertures in the plate 350 which thereby carries the shell 352 for rotation about the bearing pin 341. The inner end of the shell 352a extends in closely spaced relation to the axially extending end portion 310a of the casing 310 to provide a relatively low reluctance gap therebetween.

The winding form 318 carries a ring of permanent magnet material 344 which is stationary and is disposed radially between the polar extensions 331–338 and 361–368.

In the embodiment of FIGURES 3 and 4, if an alternating current source 370 is connected to the leads 315 and 316 and is in a half cycle where pole portions 361–368 are of instantaneous north magnetic polarity while pole portions 331–338 are of instantaneous south magnetic polarity, with the arrangement of polar portions on the permanent magnet 344 indicated in dash outline in FIGURE 4, the rotor assembly 330 including disk plate 350 will rotate in the clockwise direction indicated by the arrow 371 in FIGURE 4. The ring permanent magnet 344 has the same general arrangement of polar portions at its inner periphery as the ring magnet 160 in FIGURE 2 and the permanent magnet poles may be created in the manner described in connection with FIGURE 2.

The embodiment of FIGURES 5 and 6, and 7 and 8 illustrate timing motor arrangements utilizing large diameter rotors. In FIGURES 5 and 6 circular disk-like turntable 510 has a series of depending extensions such as indicated at 511–517 uniformly spaced about the circumference thereof which travel successively through the working gap of a magnetic core arrangement 520. It will be understood that the turntable 510 may be of generally planar disk shape with an axis of rotation which is vertical in the orientation of FIGURE 6 and is located at the center of curvature of the series of polar extensions 511–517 shown in FIGURE 5. The core structure 520 comprises a generally U-shaped piece of magnetic material which as seen in FIGURE 5 may be curved slightly in the direction of travel of the polar extensions such as 511–517. The core member comprises a base 520a, upstanding legs 520b and 520c and an inturned polar portion 520d terminating generally at the level of the base portions of the successive polar extensions 511–517; the polar extensions 511–517 join the common disk portion 510a of the turntable as indicated at 510b in FIGURE 6. An electric winding 530 encircles leg portion 520c of the core and is energized by means of a pair of leads 531 and 532 connected to a source of alternating electric potential 534. A curved permanent magnet bar 540 is secured to the leg 520b of the core 520 and is illustrated as being disposed immediately adjacent the path of the successive polar extensions 511–517 on the turntable 510. The permanent magnet member 540 may have successive polar regions of alternate polarity at its face adjacent the path of the polar extensions 511–517 as indicated diagrammatically in FIGURE 5. The successive magnetic pole portions of the permanent magnet 540 are spaced a distance approximately one-half the spacing between the successive turntable polar extensions such as 511–517. The permanent magnet 540 may be magnetized by placing pole pieces at the successive polar regions on the respective opposite sides of the magnet bar, 540a and 540b, and applying a magnetomotive force to the pole pieces in such a direction as to create magnetic lines of force through the thickness dimension of the permanent magnet 540 in the direction to create a magnetic pole of one polarity along the vertical extent of surface 540a (as viewed in FIGURE 6), and a magnetic pole of opposite polarity along the vertical extent of surface 540b in the pattern indicated in FIGURE 5. Each north or south magnetically polarized region may be substantially uniform over the vertical extent of the surfaces 540a and 540b.

When the alternating current source is connected to leads 531 and 532, during the first half-cycle of the source the winding 530 may induce a magnetic flux in the core 520 in such a direction as to increase the strength of the north polar portions along the surface 540a of the permanent magnet 540 and to induce south poles in the successive teeth or polar extensions 511–517 of the turntable. This will cause the turntable to move in the clockwise direction as indicated by arrows 571 in FIGURE 5. During the next half cycle of the source, the south poles on the magnet bar 540 along surface 540a would be strengthened and the pole extensions 511–517 of the turntable would have a north magnetic polarity and the turntable would continue to move in the clockwise direction. As in the previous embodiments, rotation may start in either direction unless mechanical means are provided for preventing rotation in an undesired direction.

FIGURES 7 and 8 illustrate a further embodiment wherein two magnets 601 and 602 are secured to end portions 603a and 603b of a core part 603 of magnetic material and an electric winding 605 links a central portion 603c of the core part 603 and has a pair of leads 607 and 608 which may suitably be connected to a source 610 of alternating current. A turntable 620 has a series of equally spaced depending polar extensions such as indicated at 621–627 in FIGURE 7 about the circumference thereof successively arcuately traveling past the magnet assembly. The turntable 620 may comprise a disk like body portion 620a which is rotatable on an axis which is vertical in the orientation of the turntable shown in FIGURE 8 and located at the radius of curvature of the arrangement of extensions 621–627 shown in FIGURE 7. The successive polar extensions 621–627 join with the disk-like base portion 620a as indicated at 620b in FIGURE 8. In this embodiment, the two magnet bars 601 and 602 may have the same type of magnetic polarization as described in connection with FIGURE 5 except that the lower magnet bar 602 has south polar portions at regions vertically aligned with regions of north polarity for the bar 601 and north polarity regions vertically aligned with south polarity regions of the bar 601. Thus where the upper magnet 601 in the position of the turntable shown in FIGURE 7 has a north polar region closest to the polar extension 622 on the turntable, the magnet 602 would have a region of south polarity adjacent this same polar extension 622. The spacing of the polar regions of the upper and lower permanent magnets 601 and 602 are identical, the successive regions being equally spaced a distance equal to one-half the center-to-center distance between successive polar extensions of the turntable such as 621–627. If during the first half cycle of the source 610 winding 605 increases the strength of the north polar regions of the upper magnet 601 and the south polar regions of the lower magnet 602 which are adjacent the polar extensions 621–627, while the south polar regions of the upper magnet 601 and the north polar regions on the lower magnet 602 are substantially cancelled, the polar extensions such as 622–626 in FIGURE 7 will be pulled clockwise in the direction of the arrow 671 in FIGURE 7. During the next half cycle of the source 610, the opposite poles will be increased in strength and the turntable will be pulled another step in the clockwise direction equal to the center-to-center spacing between the successive polar extensions such as 621–627.

It will be understood that in FIGURES 5–8, the polar extensions such as indicated at 511–517 and 621–627 are of magnetizable material so as to be magnetically polarized as a result of the magnetomotvie force applied by the winding 530 or 605.

In the embodiment of FIGURES 5–8, the windings could be associated with a turntable of magnetic materials so as to induce poles of successively opposite polarity in the polar extensions such as 511–517 or 621–627, rather than associating the winding means with the permanent magnet stator assembly.

It will be appreciated that each of the materials heretofore described as magnetic are magnetically "soft" materials, except where a permanent magnet material is specifically called for. The permanent magnet material in each of the embodiment is preferably a ceramic permanent magnet material such as unoriented barium ferrite.

It will be apparent that numerous further modifications and variations may be made without departing from the scope of the novel concepts of the present invention.

I claim as my invention:

1. An electrodynamic machine comprising magnetic core means defining a magnetic circuit having a movable element therein, said movable element having a series of movable magnetic pole portions movable therewith, and stationary electrical conductor means for coupling to the magnetic circuit defined by said magnetic core means, said magnetic core means providing further stationary magnetic pole portions arranged to coact with the series of movable magnetic pole portions of said movable element to transduce energy between an electrical form as current flow in said electrical conductor means and a mechanical form as movement of said movable element, and said magnetic core means having stationary permanent magnet means operatively associated with said magnetic circuit and providing certain of said further stationary magnetic pole portions, said movable element having said series of movable pole portions at one side of said further stationary pole portions of the magnetic core means and having another series of movable pole portions at an opposite side of said further stationary pole portions.

2. An electric motor comprising magnetic core means defining a magnetic circuit, said circuit having a stationary ring-shaped permanent magnet and annular air gaps radially inwardly and radially outwardly of said stationary permanent magnet, rotor means having annular series of pole portions in each of said air gaps, and stationary winding means coupled to said magnetic circuit for energizing said rotor pole portions to cause said stationary permanent magnet to exert a driving torque on said rotor.

3. An electrodynamic machine comprising a cup-shaped magnetic core having an end wall and a generally cylindrical portion concentrically disposed with respect to a central axis of said core and terminating in an open end remote from said end wall, a core portion of magnetic material extending from said wall along said central axis within said generally cylindrical portion, an electric winding encircling said core portion within said generally cylindrical portion, and means completing a magnetic circuit with said core and core portion, said magnetic circuit having a rotor member rotatable on said central axis of said core and disposed at the open end of said core and having permanently magnetized pole means at said open end of said core, said magnetic circuit providing pole means coupled with said winding for interaction with said permanently magnetized pole means to transduce energy between rotation of said rotor member and current flow in said winding, said permanently magnetized pole means being disposed in fixed relation to said core, and said rotor member comprising a shell-like part of magnetic material concentric with said central axis and encircling said permanently magnetized pole means and providing said pole means coupled with said winding.

4. An electrodynamic machine comprising a turntable rotatable on a central axis and having a series of magnetic pole portions extending generally axially therefrom and disposed in circumferentialy spaced relation about the periphery thereof, magnetic core means defining a magnetic circuit intersecting a portion of path of the turntable magnetic pole portions and comprising stationary permanent magnet pole means disposed for interaction with the successive turntable magnetic pole portions, and electric winding means coupled to said magnetic circuit for transducing energy between rotation of said turntable and electric current flow in said winding.

5. A synchronous A.C. motor comprising a permanent magnet stator formed by at least a portion of an annular member concentric with a central axis, said annular member having an inner peripheral surface and an outer peripheral surface radially spaced therefrom, at least one of said peripheral surfaces having a plurality of axially extending permanently magnetized poles spaced circumferentially therearound, successive poles being of opposite magnetic polarity; a low inertia cup-shaped rotor mounted for rotation about said central axis, having a central portion transverse to said central axis and a plurality of salient pole pieces of magnetizable material extending therefrom parallel to said central axis and adjacent to the permanently magnetized poles on said annular member; and an A.C. field winding fixedly mounted with respect to said stator and arranged for connection to a source of A.C. voltage for generating an alternating magnetic flux field which induces magnetic poles of the same instantaneous magnetic polarity in all such salient pole pieces disposed adjacent to the same peripheral surface of said annular member, whereby the magnetic polarity of said salient pole pieces alternates in synchronism with the A.C. voltage applied to said winding to drive the rotor past the stator in synchronism with the A.C. voltage.

References Cited by the Examiner

UNITED STATES PATENTS

| 2,483,539 | 10/1949 | Hansen et al. | 310—163 |
| 2,492,613 | 12/1949 | Bench | 310—163 |

FOREIGN PATENTS

| 545,661 | 7/1956 | Italy. |
| 201,710 | 1/1959 | Austria. |

ORIS L. RADER, *Primary Examiner.*

MILTON O. HIRSHFIELD, *Examiner.*

D. F. DUGGAN, G. SIMMONS, *Assistant Examiners.*